United States Patent
Falß et al.

(10) Patent No.: US 10,369,542 B2
(45) Date of Patent: Aug. 6, 2019

(54) MULTI-STAGE STIRRED REACTOR HAVING REDUCED BACK MIXING

(71) Applicant: BAYER AKTIENGESELLSCHAFT, Leverkusen (DE)

(72) Inventors: Sebastian Falß, Köln (DE); Leslaw Mleczko, Dormagen (DE); Karl-Robert Boos, Burscheid (DE); Sigurd Buchholz, Köln (DE)

(73) Assignee: BAYER AKTIENGESELLSCHAFT, Leverkusen (DE)

(*) Notice: Subject to any disclaimer, the term of this patent is extended or adjusted under 35 U.S.C. 154(b) by 94 days.

(21) Appl. No.: 15/305,341

(22) PCT Filed: Apr. 20, 2015

(86) PCT No.: PCT/EP2015/058514
§ 371 (c)(1),
(2) Date: Oct. 19, 2016

(87) PCT Pub. No.: WO2015/162091
PCT Pub. Date: Oct. 29, 2015

(65) Prior Publication Data
US 2017/0106345 A1     Apr. 20, 2017

(30) Foreign Application Priority Data
Apr. 22, 2014  (DE) .................. 10 2014 105 615

(51) Int. Cl.
*B01J 19/18*     (2006.01)
*B01J 19/00*     (2006.01)
(Continued)

(52) U.S. Cl.
CPC .......... *B01J 19/0066* (2013.01); *B01F 7/169* (2013.01); *B01F 7/18* (2013.01);
(Continued)

(58) Field of Classification Search
CPC ................. B01J 19/0066; B01J 19/1862
See application file for complete search history.

(56) References Cited

U.S. PATENT DOCUMENTS

| 4,370,470 | A | 1/1983 | Vidaurrl et al. |
| 6,776,963 | B1 * | 8/2004 | Akporiaye ........... B01J 19/0046 |
| | | | 422/130 |

FOREIGN PATENT DOCUMENTS

| EP | 0960651 A2 | 12/1999 |
| EP | 1273341 A1 | 1/2003 |
| WO | 2006/126891 A1 | 11/2006 |

OTHER PUBLICATIONS

Xu, Bang Cheng et al., "Interstage Backmixing for Single-Phase Systems in Compartmented, Agitated Columns: Design Correlations", Industrial & Engineering Chemistry Research, 2005, pp. 6103-6109, vol. 44.

(Continued)

*Primary Examiner* — Stuart L Hendrickson
(74) *Attorney, Agent, or Firm* — McBee Moore Woodward & Vanik IP, LLC (57) ABSTRACT

The present invention relates to a multistage stirred reactor, comprising a multiplicity of mutually adjacent reaction chambers and stirring elements for mixing the contents of at least one of the reaction chambers, wherein, between adjacent reaction chambers, there is in each case provided at least one opening that can be closed by means of closure means, such that in the open state there is a fluidic connection between the adjacent reaction chambers and in the closed state the adjacent reaction chambers are separated from one another. At least one of the closure means (300, 310, 320) is connected to an actuation rod (500, 510, 520) that is guided out of the stirred reactor. The actuation rod (500, 510, 520) can be moved back and forth between at least one first position and a second position, by rotation (Continued)

and/or displacement, wherein in the first position closure means (300, 310, 320) that are connected to the actuation rod (500, 510, 520) effect an open state of the opening assigned to them and in the second position closure means (300, 310, 320) that are connected to the actuation rod (500, 510, 520) effect a closed state of the opening assigned to them.

18 Claims, 6 Drawing Sheets (51) Int. Cl.
| | |
|---|---|
| *B01F 7/16* | (2006.01) |
| *B01F 15/00* | (2006.01) |
| *B01F 15/02* | (2006.01) |
| *B01F 15/06* | (2006.01) |
| *B01J 4/00* | (2006.01) |
| *B01F 7/18* | (2006.01) |

(52) U.S. Cl.
CPC .. *B01F 15/00798* (2013.01); *B01F 15/00805* (2013.01); *B01F 15/0267* (2013.01); *B01F 15/0268* (2013.01); *B01F 15/065* (2013.01); *B01F 15/066* (2013.01); *B01J 4/007* (2013.01); *B01J 19/1862* (2013.01); *B01F 2015/061* (2013.01); *B01F 2015/062* (2013.01); *B01F 2215/0036* (2013.01); *B01J 2219/00076* (2013.01); *B01J 2219/00087* (2013.01); *B01J 2219/00094* (2013.01)

(56) References Cited

OTHER PUBLICATIONS

Baerns, M. et al., "Technische Chemie", Wiley-VCH, pp. 352-355.
Zlokarnik, Marko, "Ruhrtechnik: Theorie und Praxis", Springer, pp. 304-309.
Couper, James R. et al, "Chemical Process Equipment: Selection and Design", Elsevier, 2005, pp, 304-315, Second Edition.
"CompactChem Reactor: A valuable aid to API productions by continuous processes", Serichim R&D Company.
International Search Report of International Patent Application No. PCT/EP2015/058514 dated Jul. 15, 2015.

* cited by examiner

MULTI-STAGE STIRRED REACTOR HAVING REDUCED BACK MIXING

CROSS-REFERENCE TO RELATED APPLICATIONS

This application is a National Stage entry of International Application No. PCT/EP2015/058514, filed Apr. 20, 2015, which claims priority to German Patent Application No. 102014105615.9, filed Apr. 22, 2014.

IDENTIFICATION OF GRANT

The work which led to this invention was sponsored by grant agreement no. 246461 as part of the European Union's Seventh Framework Programme FP7/2007-2013.

FIELD

The present invention relates to a multistage stirred reactor, comprising a multiplicity of mutually adjacent reaction chambers and stirring elements for mixing the contents of at least one of the reaction chambers, wherein, between adjacent reaction chambers, there is in each case provided at least one opening that can be closed by means of closure means, such that in the open state there is a fluidic connection between the adjacent reaction chambers and in the closed state the adjacent reaction chambers are separated from one another.

DESCRIPTION OF RELATED ART

For many types of chemical apparatus, it is advantageous to combine good mixing with a narrow residence time distribution in continuous operation. Advantages of good mixing are for example the reduction of material transition resistance, quicker homogenization or the suspension of solids.

A narrow residence time distribution often permits a higher product quality and better use of space and time. The advantages of continuous operation include consistent product quality, higher resource efficiency, lower set-up times, a higher degree of automation and lower hold-up volumes.

Possible applications for the specified profile of requirements are the continuous processing of single- or multi-phase liquids, dispersions, gas-liquid mixtures, supercritical fluids or mixtures of these materials in various types of process engineering apparatus such as chemical or biological reactors and apparatus for absorption, extraction or crystallization.

In many chemical processes, the exchange of heat that can be achieved is also a parameter to be observed. In this context, microstructured apparatuses provide the possibility of achieving very high specific heat exchange surfaces. However, due to their small volume they are not suitable for reactions having a long residence time when a certain throughput is to be achieved. In addition, the risk of fouling and blockage due to solids present in the process presents a considerable challenge, due to the small channel diameters.

Since solids, for example in the form of a heterogeneous catalyst or insoluble reaction products, are present in many engineering processes as desired or undesired components, the handling of suspended solids can present an additional requirement for the process equipment.

In practice, the defined profile of requirements can be best realized by a cascade of series-connected continuously operated stirred reactors. Under certain circumstances, a more compact construction of the apparatus may be necessary, however. Such an application is for example the installation in compact, modular production plants.

It can additionally be advantageous if the number of sealing points, in particular those with dynamic seals, is minimized. This is for example the case if the apparatus contains hazardous materials or gases such as hydrogen which, due to their high diffusivity, otherwise require elaborate constructions for sealing.

It is further known that the defined profile of requirements can also be satisfied, in certain applications, by dividing a flow pipe into multiple compartments that are each mixed with suitable stirrers and are connected to one another via openings.

However, the performance of such an apparatus is greatly dependent on the operating conditions. A high rotational speed of the stirrers, long residence times and large openings between the individual compartments lead to a relatively high degree of back mixing, and thus to a broader residence time distribution (e.g. L. Zhang, Q. Pan, G. L. Rempel, Residence Time Distribution in a Multistage Agitated Contactor with Newtonian Fluids: CFD Prediction and Experimental Validation: Industrial & Engineering Chemistry Research, Ind. Eng. Chem. Res. 46 2007, 3538-3546.).

Apparatus of this kind is widely used in particular in the extraction industry. Theoretically, back mixing can be minimized by using very small openings between adjoining compartments. However, in this case the pressure loss in the apparatus rises and the removal of solids is no longer possible, such that this measure is often unsuitable for practical applications.

DE 32 13 628 A1 describes a contact apparatus that consists of a vertical, long cylindrical housing with closed ends which is divided into multiple individual chambers by horizontal baffle plates, with access from one chamber to the next via concentric, circular openings which are centered axially in the baffle walls, with a continuously rotatable shaft that extends concentrically with the baffle walls within the housing, with, in each chamber, at least one stirrer that is attached to the shaft, wherein the shaft in the circular openings provides annular openings in the baffle walls such that the ratio of the back flow rate to the feed rate through the openings is less than 1.5. Also described is a method for the continuous preparation of arylene sulfide polymers, in which reaction components that are suitable for the preparation of poly(arylene sulfide) are fed into at least one first chamber of the above-described contact vessel, so as to form a reaction mixture that is fed through the chambers of the contact apparatus, while each chamber is held under conditions for the formation of arylene sulfide polymers, and arylene sulfide polymers are obtained from a chamber that is remote from the chamber into which the starting reaction components are introduced. The degree of back mixing that can be achieved in apparatus of this kind is often too high for applications that require a very narrow residence time distribution, in particular if the reactor volume is small (several liters or less) and the number of steps that can be realized is thus limited.

WO 2006/126891 (EP 1 904 225) discloses, for example, a cylindrical reactor for continuous treatment of an agitated material composition, comprising at least two components, comprising a number of reactor chambers arranged in a mainly vertical column, separated by bottom plates; while transportation of the material composition from an arbitrary reactor chamber during stationary conditions is arranged so as to take place to the below adjoining chamber, wherein each reactor chamber is provided with a paddle mechanism.

The paddle mechanism comprises an annular member that is concentric with the reactor chamber and has a vertical elongation and at least one movable stirring member that is arranged so as to impart a vertical movement component to the material in the chamber. The transportation is arranged from one chamber to the next chamber so as to take place periodically via an opening, having a slide flap, in the bottom plate of each chamber. However, such an apparatus has the drawback that an additional moving part—and therefore also a seal connected thereto—has to be provided for each chamber.

It can thus be stated that the combination of good mixing and a narrow residence time distribution can be realized only unsatisfactorily, in continuous operation in currently available apparatus, for process engineering material systems that require a long residence time and in which there is a certain quantity of solids.

SUMMARY

The present invention addresses the problem of providing an apparatus that combines the stated requirements. Preferably, this apparatus also provides the greatest possible specific heat exchange surface.

According to the invention, this object is achieved with a multistage stirred reactor, comprising a multiplicity of mutually adjacent reaction chambers and stirring elements for mixing the contents of at least one of the reaction chambers, wherein, between adjacent reaction chambers, there is in each case provided at least one opening that can be closed by means of closure means, such that in the open state there is a fluidic connection between the adjacent reaction chambers and in the closed state the adjacent reaction chambers are separated from one another.

The reactor is characterized in that at least one of the closure means is connected to an actuation rod that is guided out of the stirred reactor, the actuation rod can be moved back and forth between at least one first position and a second position, by rotation and/or displacement, wherein in the first position closure means that are connected to the actuation rod effect an open state of the opening assigned to them and in the second position closure means that are connected to the actuation rod effect a closed state of the opening assigned to them.

The stirred reactor according to the invention can of course be used not only for chemical reactions in the more restricted sense, but also, for example, for extractions and the like.

BRIEF DESCRIPTION OF THE DRAWINGS

FIGS. 1-6 depict embodiments as described herein.

DETAILED DESCRIPTION OF A PREFERRED EMBODIMENT

Fundamentally, the multistage stirred reactor according to the invention can be considered as a flow pipe divided into multiple chambers. The opening areas available for throughflow from one chamber to the next can be changed dynamically using the opening and closing mechanism operated by means of the actuation rod(s). Periodic switching from the open state to the closed state reduces back mixing between the individual reaction chambers.

It is also possible for the actuation rod to tarry between the first and second positions, and thus the openings between the individual reaction chambers can be adjusted in a step-free manner.

In the stirred reactor according to the invention, any solids that arise can also be transported from one reaction chamber to the next and can be removed from the reactor.

In many cases, it is possible to achieve improved mixing by using baffles in the individual reaction chambers. These prevent co-rotation of liquids and increase the turbulence in the chambers. It is thus possible to prevent phase separation due to differences in density.

In order for the stirred reactor according to the invention to be able to cover the broadest possible field of application, it is possible to construct it in a modular and thus flexible manner. It is thus possible for the reactor to be constructed such that the number of reaction chambers can be adapted to the reactor without extensive changes. This can be achieved by the bottoms of the reaction chambers not being solidly connected to a reactor internal wall. Rather, they are connected to one another by removable spacers and are introduced as an entire component, for example into an outer shell. The bottom spacing is thus easy to adapt by exchanging the spacers. Such a construction makes it possible not only to adapt the number of chambers but also to set various chamber sizes, for example if a greater heat exchange surface is required at the inlet than at the outlet, as in the case of a chemical reaction that proceeds very rapidly to begin with.

Advantageous refinements and further aspects of the present invention are outlined hereinafter. Said aspects and refinements may be combined with one another as desired unless the opposite is clear from the context.

In one embodiment of the stirred reactor according to the invention, all of the present closure means of the openings are connected to a common actuation rod.

In another embodiment of the stirred reactor according to the invention, the stirring elements are driven by means of a common stirring shaft and the stirring shaft simultaneously represents the actuation rod of the closure means.

In another embodiment of the stirred reactor according to the invention, the actuation rod is designed to be displaceable and the closure means are designed as stoppers at bottoms of the reaction chambers.

In another embodiment of the stirred reactor according to the invention, the actuation rod is designed to be rotatable and the closure means are designed such that they can be pivoted away from the openings.

In another embodiment of the stirred reactor according to the invention, at least one of the bottoms is designed as a heat exchanger through which a heat transfer medium flows. Thus, in addition to the reactor wall, the bottom of a reaction chamber can also be used for heat transport. For example, such a bottom comprises, in addition to the opening for a stirring shaft and the possibly present opening for closure means, input and output ports through which the temperature control medium can flow in and, respectively, out, and via which the individual bottoms can be connected to one another by means of suitable connection elements with respect to the flow of the heat transfer medium. The flow guiding at the bottom of the reactor chamber can also be influenced by means of suitable inserts.

In another embodiment of the stirred reactor according to the invention, at least one of the reaction chambers further comprises a heating and/or cooling spiral. Such heating and/or cooling spirals can also simultaneously function as baffles in the reaction chambers.

In another embodiment of the stirred reactor according to the invention, at least one of the reaction chambers comprises additional input and/or discharge ports through which substances can be introduced and/or removed. It is possible for multiple reaction chambers to be connected to one another via additional input and/or discharge ports.

Additional input and/or discharge ports can be desirable in order for not all of the reaction components to be added at the start of the reactor but along the reactor. It is thus possible, in a chemical reaction, to suppress undesirable side reactions or further reactions, for example. Similarly, it can be desirable to separate resulting materials.

Another aspect of the present invention is a method for carrying out a chemical reaction, wherein the reaction is carried out in a stirred reactor according to the invention and the actuation rod or rods is/are moved back and forth between the first position and the second position.

In one embodiment of the method according to the invention, the reaction is carried out, at least some of the time, with a constant quantity of substances introduced into the reactor and removed from the reactor. This variant can be defined with the keyword "constant feed stream". In the case of incompressible reactor contents, a constant stream from one reaction chamber into the next should therefore be possible. Fundamentally, this can occur in three ways: a gap is provided between the bottoms and a stirring shaft (where present), a gap is provided between the bottoms and the reactor jacket (where present), and by means of a partially open opening and closing mechanism. If solids are present, the opening and closing mechanism can be actuated periodically in order to permit the removal of solids through the widened opening, and in order to suppress back mixing during the other phases.

In another embodiment of the method according to the invention, substances are introduced into and removed from the reactor when the actuation rod or rods is/are in the first position and no substances are introduced or removed when the actuation rod or rods is/are in the second position. This variant can be defined with the keyword "dynamic feed stream". The reactor is operated with temporally variable feed stream, the feed stream being ideally synchronized, by a suitable control, with the opening and closing mechanism. When the opening and closing mechanism is actuated to widen the opening, the feed stream is also increased. Accordingly, when the opening and closing mechanism is closed, the feed stream is reduced. This manner of operation offers the advantage that, in those phases when the opening and closing mechanism is open, back mixing between individual reaction chambers is suppressed by the increased flow through the apparatus.

In another embodiment of the method according to the invention, the stirred reactor is a stirred reactor according to the invention having the following features: at least one of the reaction chambers comprises additional input and/or discharge ports through which substances can be introduced and/or removed, and moreover multiple reaction chambers are connected to one another by additional input and/or discharge ports. In at least one reaction chamber at least one operating state is monitored, and in the event of a predetermined deviation of the operating state from a predetermined value for this operating state the input ports opening into this reaction chamber are closed and the substances originally transported through these input ports are introduced into a different reaction chamber.

Preferably, the monitored operating state is the pressure drop from one reaction chamber to the adjacent reaction chamber.

This reaction management makes it possible, in the event of blockages or other disruptions in a reaction chamber, to shut the latter down and to guide the material streams in the reactor past this chamber. Thus, the reaction can be continued at a downstream location.

Finally, the present invention also relates to the use of a stirred reactor according to the invention for carrying out chemical reactions.

The present invention is illustrated in detail by the figures which follow, but without being restricted thereto. The figures show:

FIG. 1 shows a first multistage stirred reactor according to the invention in a first configuration, in which the individual reaction chambers are not fluidically connected to one another. The reactor takes the form of a cylindrical tank with an inlet material stream 700 and an outlet material stream 710, respectively for the reactants and products of the reaction.

Figure 1:
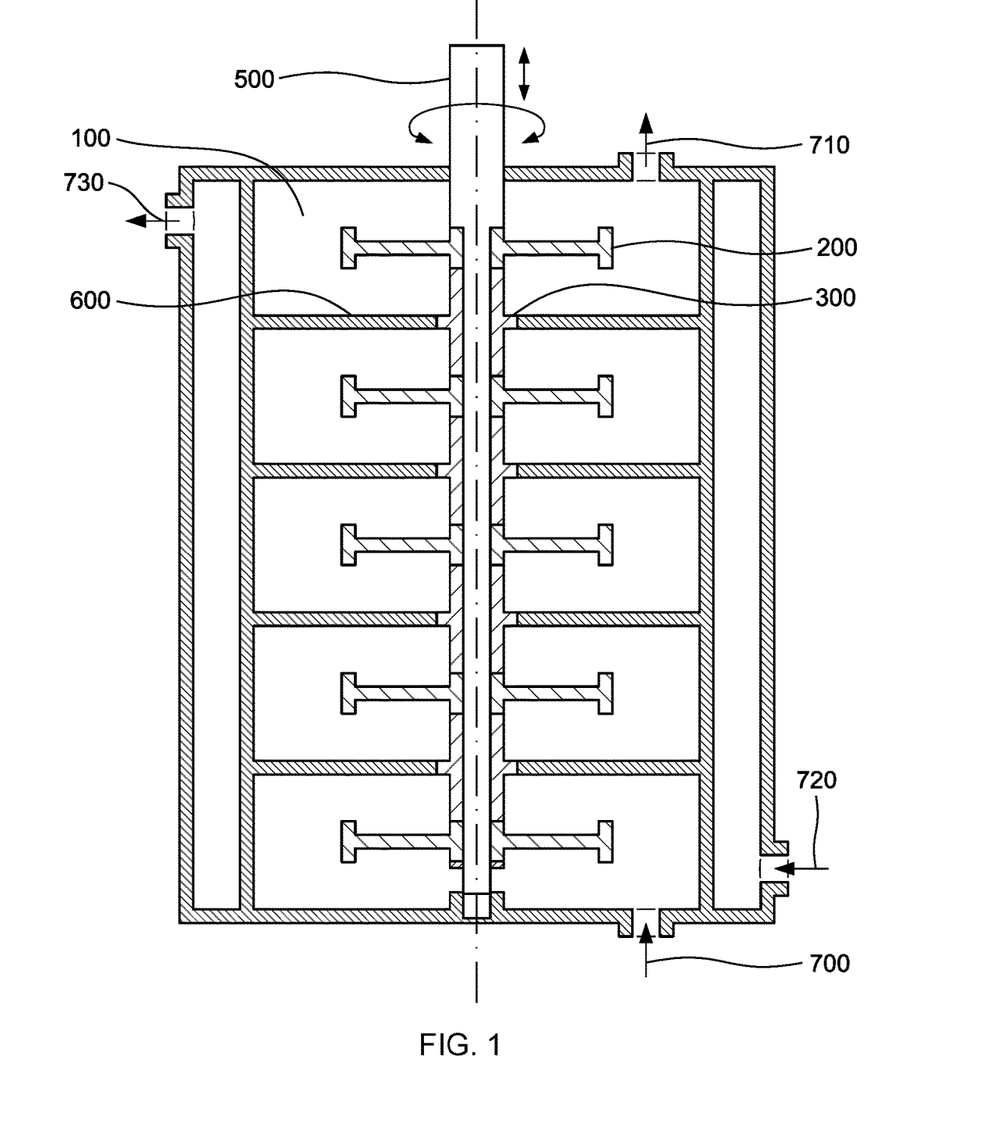
FIG. 1 a first multistage stirred reactor according to the invention in a first configuration FIG. 2 the first multistage stirred reactor according to the invention in a second configuration FIG. 3 a second multistage stirred reactor according to the invention in a first configuration FIG. 4 the second multistage stirred reactor according to the invention in a second configuration FIG. 5 a third multistage stirred reactor according to the invention in a first configuration FIG. 6 the third multistage stirred reactor according to the invention in a second configuration

Individual reaction chambers 100 are inside the reactor and are separated from one another by bottoms 600. Each of the reaction chambers has a stirring element 200 by means of which the contents of the chamber can be mixed. In that context, the stirring elements are arranged on a central shaft that is driven by a motor (not shown). As will be explained below, in this embodiment of the stirred reactor according to the invention, the drive shaft simultaneously acts as the actuation rod 500 for operating the closure means between the chambers 100.

The bottoms 600 of the reaction chambers 100 have passages for the drive shaft, or the actuation rod 500. In addition to the stirring elements 200, closure means 300 are also on the shaft/actuation rod 500. In the first position of the actuation rod 500, which is illustrated in FIG. 1, the closure means 300 close the individual reaction chambers 100 off from one another, such that no exchange of materials can take place. However, by virtue of a translatory movement of the actuation rod 500, the closure means 300 can open the individual bottoms 600.

Furthermore, the stirred reactor is surrounded by a heating/cooling jacket. A heat transfer medium can be introduced and removed via the inlet material stream 720 and the outlet material stream 730, such that it is possible to influence the temperature of the chemical reaction taking place in the reactor.

The advantage of the embodiment shown here lies in the fact that, due to the double function of the stirring shaft and the actuation rod 500, only one seal with respect to the environment is required.

Figure 2:
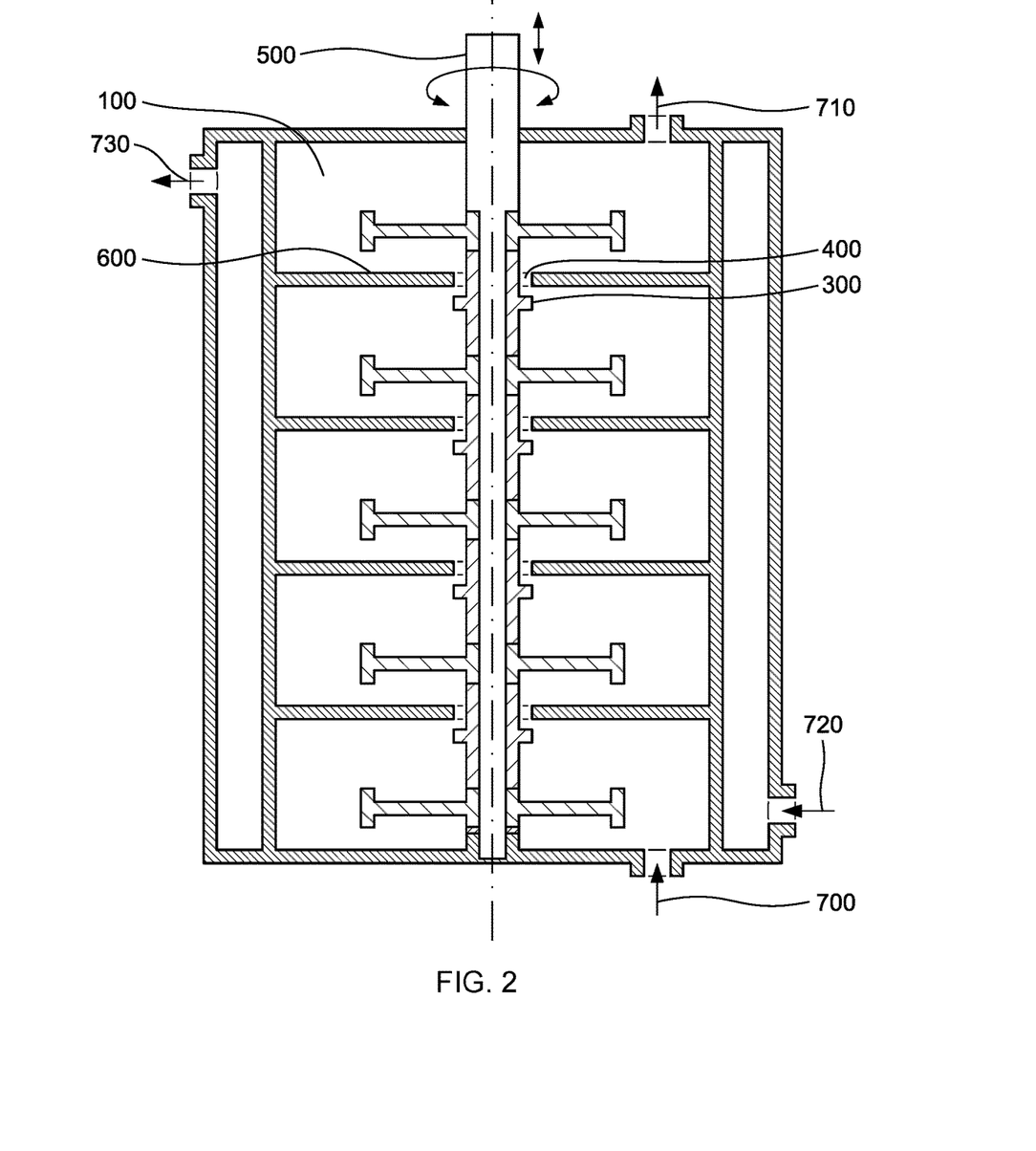

FIG. 2 shows the first multistage stirred reactor according to the invention in a second configuration, in which the individual reaction chambers are fluidically connected to one another. By displacing the stirring shaft/the actuation rod 500, the closure elements 300 have been moved away from the bottoms 600 and the openings 400 have been opened.

Figure 3:
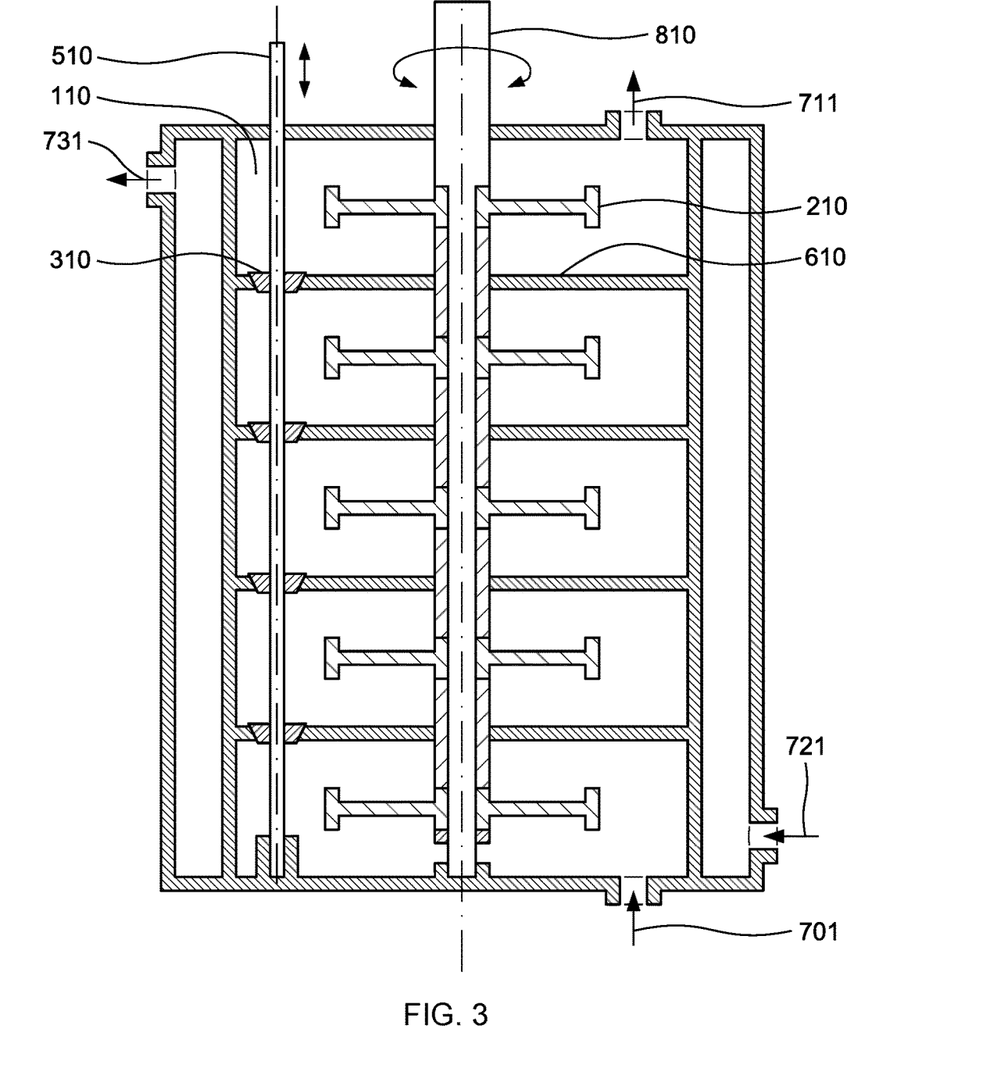

FIG. 3 shows a second multistage stirred reactor according to the invention in a first configuration, in which the individual reaction chambers are not fluidically connected to one another. The reactor takes the form of a cylindrical tank with an inlet material stream 701 and an outlet material stream 711, respectively for the reactants and products of the reaction.

Individual reaction chambers 110 are inside the reactor and are separated from one another by bottoms 610. Each of the reaction chambers has a stirring element 210 by means of which the contents of the chamber can be mixed. In that context, the stirring elements are arranged on a central shaft 810 that is driven by a motor (not shown).

The bottoms 610 of the reaction chambers 110 have passages for the drive shaft 810. The openings for the passage of the shaft 810 are in this case closed by means of suitable sealing or bearing elements.

In this reactor, the closure means 310 are connected to an actuation rod 510 that is different from the shaft 810. In the first position of the actuation rod 510, which is illustrated in FIG. 3, the closure means 310 close the individual reaction chambers 110 off from one another in the manner of a stopper, such that no exchange of materials can take place. However, by virtue of a translatory movement of the actuation rod 510, the closure means 310 can open the individual bottoms 610.

Furthermore, the stirred reactor is surrounded by a heating/cooling jacket. A heat transfer medium can be introduced and removed via the inlet material stream 721 and the outlet material stream 731, such that it is possible to influence the temperature of the chemical reaction taking place in the reactor.

The advantage of the embodiment shown here is that each seal has to seal, with respect to the environment, only one form of movement (rotary or translatory).

Figure 4:
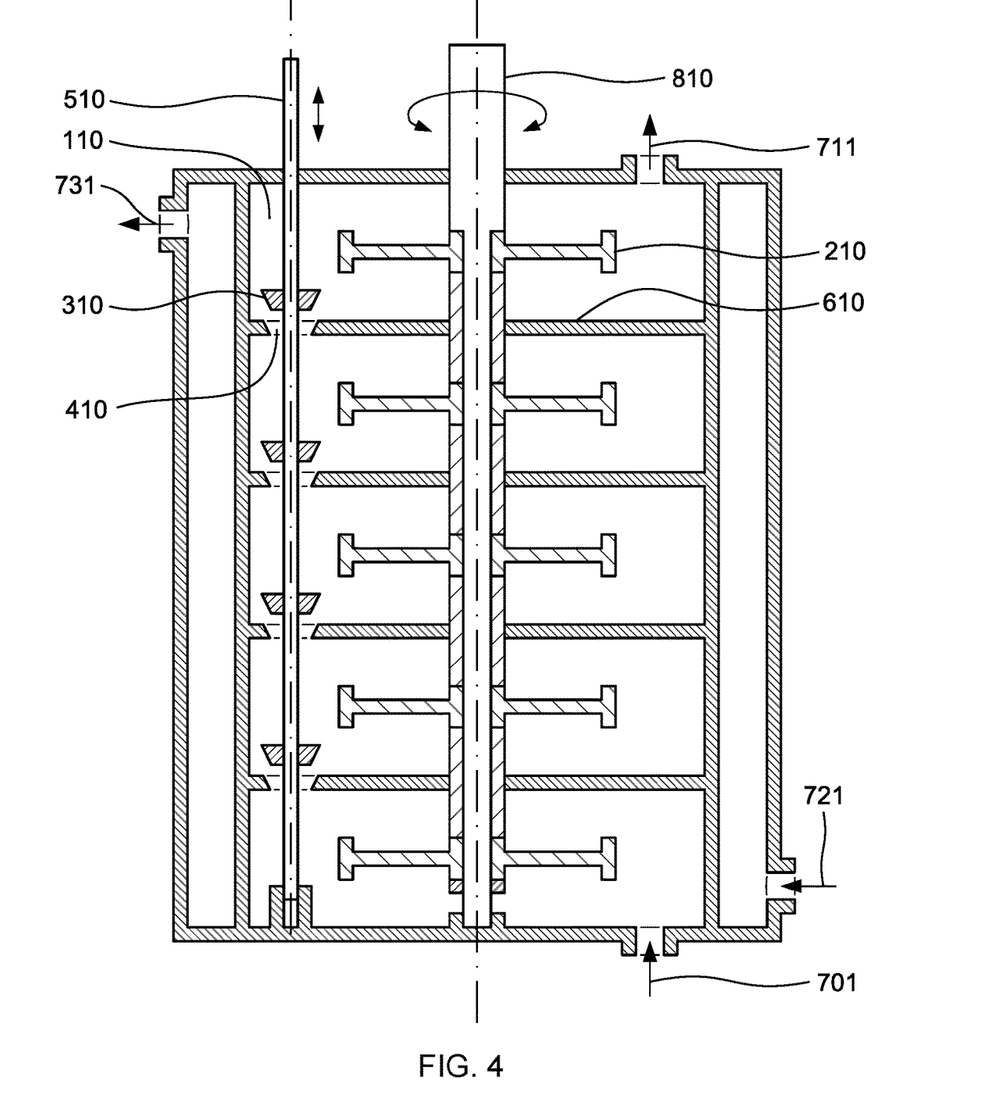

FIG. 4 shows the second multistage stirred reactor according to the invention in a second configuration, in which the individual reaction chambers are fluidically connected to one another. By displacing the actuation rod 510, the closure elements 310 have been moved away from the bottoms 610 and the openings 410 have been opened.

Figure 5:
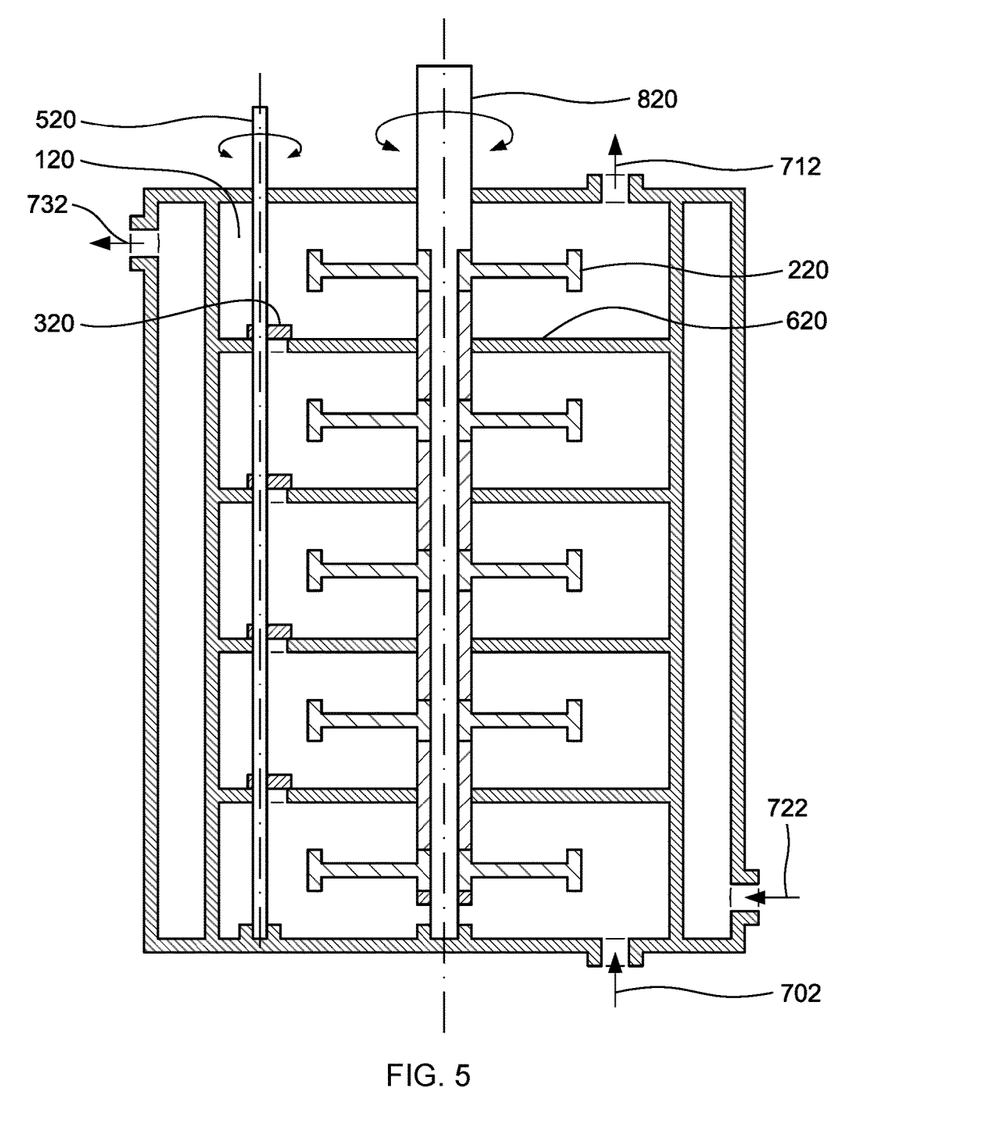

FIG. 5 shows a third multistage stirred reactor according to the invention in a first configuration, in which the individual reaction chambers are not fluidically connected to one another. The reactor takes the form of a cylindrical tank with an inlet material stream 702 and an outlet material stream 712, respectively for the reactants and products of the reaction.

Individual reaction chambers 120 are inside the reactor and are separated from one another by bottoms 620. Each of the reaction chambers has a stirring element 220 by means of which the contents of the chamber can be mixed. In that context, the stirring elements are arranged on a central shaft 820 that is driven by a motor (not shown).

The bottoms 620 of the reaction chambers 120 have passages for the drive shaft 820. The openings for the passage of the shaft 820 are in this case closed by means of suitable sealing or bearing elements.

In this reactor, the closure means 320 are connected to an actuation rod 520 that is different from the shaft 820. In the first position of the actuation rod 520, which is illustrated in FIG. 5, the closure means 320 close the individual reaction chambers 120 off from one another in the manner of a pivoting lid, such that no exchange of materials can take place. However, by virtue of a rotary movement of the actuation rod 520, the closure means 320 can open the individual bottoms 620.

Furthermore, the stirred reactor is surrounded by a heating/cooling jacket. A heat transfer medium can be introduced and removed via the inlet material stream 722 and the outlet material stream 732, such that it is possible to influence the temperature of the chemical reaction taking place in the reactor.

Figure 6:
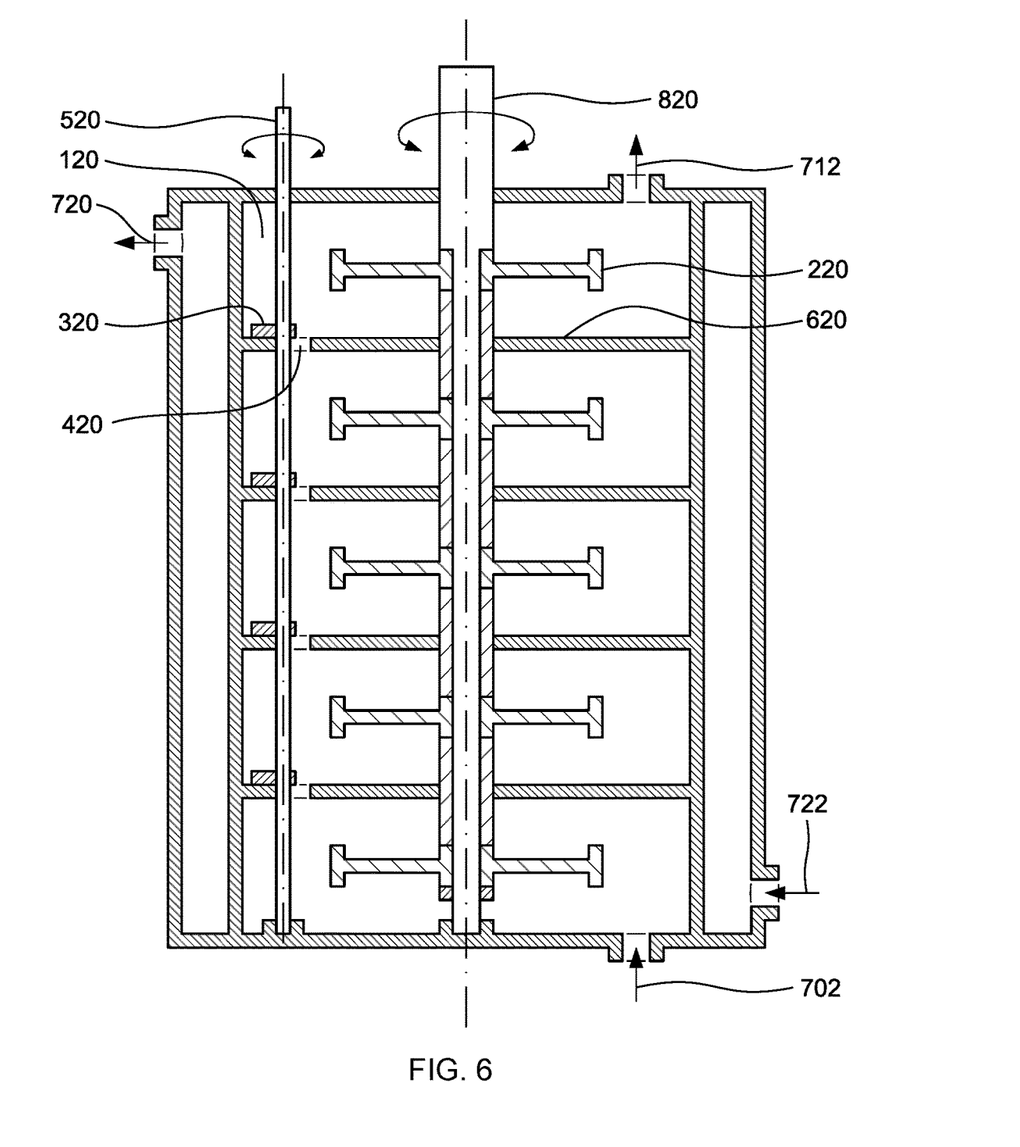

FIG. 6 shows the third multistage stirred reactor according to the invention in a second configuration, in which the individual reaction chambers are fluidically connected to one another. By rotating the actuation rod 520, the closure elements 320 have been moved away from the bottoms 620 and the openings 420 have been opened.

Although the stirred reactors according to the invention shown in FIGS. 1 to 6 have been illustrated as standing upright and with a flow direction of the reactant or product streams from bottom to top, all of the modes of operation of the stirred reactors according to the invention are in principle independent of the flow direction and of the orientation of the apparatus. Throughflow from bottom to top (relative to the direction of gravity) can be advantageous if one wishes to convey a gas-liquid mixture in cocurrent at low flow speeds. Horizontal operation permits the formation of a gas phase above the liquid phase, which makes it possible to draw off gaseous byproducts. Throughflow from top to bottom, for its part, has advantages if solids have to be removed.

The invention claimed is:

1. A multistage stirred reactor, comprising:
a multiplicity of mutually adjacent reaction chambers;
one or more stirring elements for mixing the contents of at least one of the reaction chambers;
wherein, between adjacent reaction chambers, there is in each case provided at least one opening that can be closed by means of closure means, such that in an open state there is a fluidic connection between the adjacent reaction chambers and in the closed state the adjacent reaction chambers are separated from one another;
at least one input port and at least one output port:
wherein
each of the one or more stirring elements are driven by a common stirring shaft,
all of the closure means of the openings are connected to a common actuation rod that is guided out of the stirred reactor,
the actuation rod can be moved back and forth between at least one first position and a second position, by rotation and/or displacement,
wherein in a first position, closure means that are connected to the actuation rod effect an open state of the opening assigned to them and
in a second position, closure means that are connected to the actuation rod effect a closed state of the opening assigned to them.

2. The stirred reactor as claimed in claim 1 wherein the through-flow of a reactant/product stream is in a horizontal direction.

3. The stirred reactor as claimed in claim 1, wherein the stirring shaft is simultaneously the actuation rod of the closure means.

4. The stirred reactor as claimed in claim 1, wherein the actuation rod is displaceable and the closure means are stoppers at the bottoms of the reaction chambers.

5. The stirred reactor as claimed in claim 1, wherein the actuation rod is rotatable and the closure means are pivoted away from the openings.

6. The stirred reactor as claimed in claim 1, wherein at least one bottom is a heat exchanger through which a heat transfer medium flows.

7. The stirred reactor as claimed in claim 1, wherein at least one of the reaction chambers further comprises a heating and/or cooling spiral.

8. The stirred reactor as claimed in claim 7 wherein the heating/cooling spiral is configured as a baffle in at least one reaction chamber.

9. The stirred reactor as claimed in claim 1, wherein at least one of the reaction chambers comprises a first additional input and/or discharge ports through which one or more substances can be introduced and/or removed.

10. The stirred reactor as claimed in claim 9, wherein multiple reaction chambers are connected to one another by a second additional input and/or discharge ports.

11. The stirred reactor as claimed in claim 1 further comprising a heating/cooling jacket wherein the heating/cooling jacket surrounds the reactor.

12. The stirred reactor as claimed in claim 1 further comprising at least one baffle in at least one of the mutually adjacent reaction chambers.

13. A multistage stirred reactor, comprising:
a multiplicity of mutually adjacent reaction chambers;
one or more stirring elements for mixing the contents of at least one of the reaction chambers;
wherein, between adjacent reaction chambers, there is in each case provided at least one opening that can be closed by means of closure means, such that in an open state there is a fluidic connection between the adjacent reaction chambers and in the closed state the adjacent reaction chambers are separated from one another;
wherein
at least one closure means is connected to an actuation rod that is guided out of the stirred reactor,
the actuation rod can be moved back and forth between at least one first position and a second position, by rotation and/or displacement,
wherein in a first position, closure means that are connected to the actuation rod effect an open state of the opening assigned to them,
in a second position, closure means that are connected to the actuation rod effect a closed state of the opening assigned to them, and
wherein the actuation rod is designed to be rotatable and the closure means are designed such that they can be pivoted away from the openings.

14. A method for carrying out a chemical reaction, wherein the reaction is carried out in a stirred reactor as claimed in claim 1 and the actuation rod or rods is/are moved back and forth between the first position and the second position.

15. The method as claimed in claim 14, wherein the reaction is carried out, at least some of the time, with a constant quantity of substances introduced into the reactor and removed from the reactor.

16. The method as claimed in claim 14, wherein substances are introduced into and removed from the reactor when the actuation rod or rods is/are in the first position and no substances are introduced or removed when the actuation rod or rods is/are in the second position.

17. The method as claimed in claim 14, wherein the stirred reactor is a stirred reactor, in at least one reaction chamber at least one operating state is monitored, and in the event of a predetermined deviation of the operating state from a predetermined value for this operating state the input ports opening into this reaction chamber are closed and the substances originally transported through these input ports are introduced into a different reaction chamber.

18. The method as claimed in claim 17, wherein the monitored operating state is the pressure drop from one reaction chamber to the adjacent reaction chamber.

* * * * *